United States Patent [19]

Yamazaki

[11] Patent Number: 4,525,436
[45] Date of Patent: Jun. 25, 1985

[54] LIGHT ENERGY CONVERSION SYSTEM

[75] Inventor: Shunpei Yamazaki, Tokyo, Japan

[73] Assignee: Semiconductor Energy Laboratory Co., Ltd., Tokyo, Japan

[21] Appl. No.: 479,560

[22] Filed: Mar. 28, 1983

[30] Foreign Application Priority Data

Mar. 29, 1982 [JP] Japan ................................ 57-50533

[51] Int. Cl.³ ............................................ H01M 6/36
[52] U.S. Cl. .................... 429/111; 204/266; 204/275; 204/263; 204/278; 204/129
[58] Field of Search .............. 429/111; 204/258, 263, 204/266, 275, 278, 129

[56] References Cited

U.S. PATENT DOCUMENTS

| 4,021,323 | 5/1977 | Kilby et al. | 204/129 |
| 4,381,233 | 4/1983 | Adachi et al. | 204/242 |
| 4,388,482 | 6/1983 | Hamakawa et al. | 136/258 AM |

FOREIGN PATENT DOCUMENTS

| 52-12693 | 1/1977 | Japan | 429/111 |
| 54-4582 | 1/1979 | Japan | 429/111 |

OTHER PUBLICATIONS

R. Williams, "Schottky Barriers At The Interface Between Amorphous Silicon and Electrolytes", *J. Appl. Phys.*, vol. 50, pp. 2848-2851, (1979).

M. S. Wrighton, "Photochemistry", *Chemical & Eng. News*, Sep. 3, 1979, p. 37.

A. J. Nozik, "Photochemical Diodes", *Appl. Phys. Lett.*, vol. 30, pp. 567-569, (1977).

J. Manassen et al., "Electrochemical, Solid State, Photochemical & Technological Aspects of Photoelectrochemical Energy Converters", *Nature*, vol. 263, pp. 97-100, (1976).

*Primary Examiner*—Aaron Weisstuch
*Attorney, Agent, or Firm*—Murray, Whisenhunt & Ferguson

[57] ABSTRACT

First and second semiconductor photoelectric conversion structures, each having a PIN junction, are assembled as a unitary structure with a redox reaction chamber. Heavily doped N and P type semiconductor layers of the first and second semiconductor photoelectric conversion layers, respectively, are held in contact with first and second aqueous solutions contained in first and second cells of the redox reaction chamber. By interconnecting first and second electrodes connected to the P and N type semiconductor layers, respectively, of the first and second semiconductor photoelectric conversion structures, $H_2$ and $O_2$ gases are released from the first and second cells, respectively. Alternatively, electrical leads may be connected to the above N and P layers whereby the unitary structure may be employed as a source of electrical energy.

10 Claims, 6 Drawing Figures

LIGHT ENERGY CONVERSION SYSTEM

BACKGROUND OF THE INVENTION

1. Field of the Invention

The present invention relates to a light energy conversion system and, more particularly to a light energy conversion system which converts light energy into electrical energy and electrolyzes an aqueous solution by the electrical energy to generate oxygen and hydrogen gases.

2. Description of the Prior Art

Heretofore there have been proposed various light energy conversion systems of this type, which are usually provided with a semiconductor photoelectric conversion structure for converting light energy into electrical energy, an electrolyzer provided separately of the semiconductor photoelectric conversion structure and comprising a redox reaction chamber containing an aqueous solution, for electrolyzing the aqueous solution by the photoelectrically generated electrical energy to generate oxygen and hydrogen gases and first and second electrodes held in contact with the aqueous solution in the redox reaction chamber, and first and second connecting means for electrically interconnecting a pair of electrodes of the semiconductor photoelectric conversion structure and the first and second electrodes of the electrolyzer.

Such prior art light energy conversion systems are bulky as a whole because the semiconductor photoelectric conversion structure and the electrolyzer are provided separately of each other.

Furthermore, the conventional systems require the first and second electrodes for contact with the aqueous solution contained in the redox reaction chamber of the electrolyzer and necessitate the first and second connecting means for electrically connecting the semiconductor photoelectric conversion structure to the electrode held in contact with the aqueous solution contained in the redox reaction chamber of the electrolyzer. Accordingly, the prior art light energy conversion systems are disadvantageous in that they involve the use of a large number of parts and require much time for electrically connecting an electrode of the semiconductor photoelectric conversion structure to the electrode held in contact with the aqueous solution in the redox reaction chamber.

SUMMARY OF THE INVENTION

It is therefore an object of the present invention to provide a novel light energy conversion system which is free from the above said defects of the prior art.

Briefly stated, the light energy conversion system of the present invention comprises a redox reaction chamber provided with first and second cells intercommunicating through a bridge and respectively containing first and second aqueous solutions of the same kind, and hydrogen and oxygen gas outlet means respectively extending outwardly of the first and second cells; a first photoelectric conversion semiconductor structure having a P type first semiconductor layer, an I type (intrinsic) second semiconductor layer formed on the first semiconductor layer and a heavily doped N type third semiconductor layer formed on the second semiconductor layer and held in contact with the first aqueous solution in the first cell of the redox reaction chamber on the side opposite that facing the second semiconductor layer; a second semiconductor photoelectric conversion structure having a fourth semiconductor layer of the N conductivity type, an I type (intrinsic) fifth semiconductor layer formed on the fourth semiconductor layer and a heavily doped sixth semiconductor layer of the P conductivity type, formed on the fifth semiconductor layer and held in contact with the second aqueous solution in the second cell of the redox reaction chamber on the side opposite that facing the fifth semiconductor layer; a first electrode connected to the first semiconductor layer of the first semiconductor photoelectric conversion structure; a second electrode connected to the fourth semiconductor layer of the second semiconductor photoelectric conversion structure and paired with the first electrode; and means for electrically interconnecting the first and second electrodes.

According to the light energy conversion system of the present invention, when the first and second semiconductor photoelectric conversion structures are exposed to irradiation by light, electric current is generated between (a) the third semiconductor layer of the first semiconductor photoelectric conversion structure and the first electrode on the side of the third semiconductor layer (negative pole) and (b) between the sixth semiconductor layer of the second semiconductor photoelectric conversion structure and the second electrode on the side of the sixth semiconductor layer (positive pole). The third and sixth semiconductor layers of the first and second semiconductor photoelectric conversion structures make contact with the first and second aqueous solutions contained in the first and second cells of the redox reaction chamber, respectively.

Accordingly, by electrically connecting the first and second electrodes through electric connecting means, a cathodic reduction reaction occurs in the first cell of the redox reaction chamber and, in the second cell, an anodic oxidation reaction occurs.

As a result of this, hydrogen gas is generated in the first cell and it can be recovered through the first gas outlet means. Oxygen gas is generated in the second cell and it can also be recovered through the second gas outlet means.

According to the light energy conversion system of the present invention, the first and second semiconductor photoelectric conversion structures and the redox reaction chamber are formed as a unitary structure with the third and sixth semiconductor layers of the first and second semiconductor photoelectric conversion structures held in contact with the first and second aqueous solutions contained in the first and second cells of the redox reaction chamber, respectively. Therefore, the light energy conversion system of the present invention can be made compact as compared with the aforementioned conventional light energy conversion systems.

Besides, according to the light energy conversion system of the present invention, since the third and sixth semiconductor layers of the first and second semiconductor photoelectric conversion structures are held in contact with the first and second aqueous solutions contained in the first and second cells of the redox reaction chamber, there is no need of providing any other electrode in contact with the aqueous solution in the redox reaction chamber. Moreover, the electric connecting means associated with the semiconductor photoelectric conversion structures may be the only means for electrically connecting the first and second electrodes. Accordingly, as compared with the prior art systems, the system of the present invention has the advantages that the number of parts used is small and that the electrical connections relates to the semiconductor photoelectric conversion structures are less troublesome and time-consuming.

Other objects, features, and advantages of the present invention will become more fully apparent from the following description taken in conjunction with the accompanying drawings.

DESCRIPTION OF THE PREFERRED EMBODIMENTS

Figure 1:
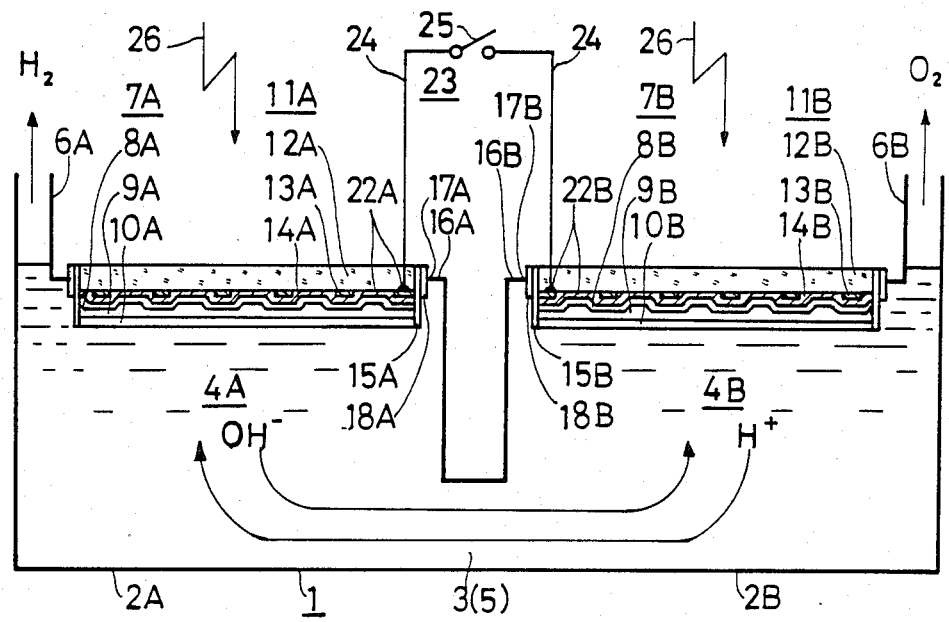
FIG. 1 is a sectional view schematiclly illustrating a first embodiment of the light energy conversion system of the present invention.

FIG. 1 illustrates in section a first embodiment of the light energy conversion system of the present invention, which is provided with a redox reaction chamber 1.

The redox reaction chamber 1 comprises first and second cells 2A and 2B, which intercommunicate through a bridge 3 and have introduced thereinto first and second aqueous solutions 4A and 4B of the same kind, respectively.

The bridge 3 is formed by an aqueous solution bridge 5 which constitutes a path that permits the passage therethrough of the aqueous solutions 4A and 4B locally between the cells 2A and 2B, for example, at the lower end portion thereof.

The aqueous solutions 4A and 4B contained in the cells 2A and 2B may be one that consists of pure water as a solvent and a small amount of electrolyte for promoting ionization, such as tin iodinate or the like.

The redox reaction chamber 1 has hydrogen and oxygen gas outlet means 6A and 6B, respectively, formed integrally therewith to extend upwardly, for instance, from the top end portions of the cells 2A and 2B, respectively.

The first embodiment of the light energy conversion system of the present invention is provided with first and second semiconductor photoelectric conversion structures 7A and 7B in addition to the above said redox reaction chamber 1.

The semiconductor photoelectric conversion structure 7A comprises a P type first semiconductor layer 8A, an I type second semiconductor layer 9A formed on the first semiconductor layer 8A, and an N type third semiconductor layer 10A formed on the second semiconductor layer 9A.

The first semiconductor photoelectric conversion structure 7A is formed, in practice, by a known CVD, reduced pressure CVD, or plasma CVD method on a light transparent conductive substrate 11A. In this case, the light transparent conductive substrate 11A has a light transparent insulating substrate proper 12A, a comb-shaped lead-out electrode 13A formed on the light transparent conductive substrate 11A, and a light transparent conductive film 14A formed on the light transparent conductive substrate 11A to cover the lead-out electrode 13A.

The second semiconductor photoelectric conversion structure 7B comprises an N type fourth semiconductor layer 8B, an I type fifth semiconductor layer 9B formed on the fourth semiconductor layer 8B, and a P type sixth semiconductor layer 10B formed on the fifth semiconductor layer 9B.

The second semiconductor photoelectric conversion structure 7B is also formed, in practice, by a known CVD, reduced pressure CVD, or plasma CVD method on a light transparent conductive substrate 11B. In this case, the light transparent conductive substrate 11B has a light transparent insulating substrate proper 12B, a comb-shaped lead-out electrode 13B formed on the light transparent conductive substrate 11B and a light transparent conductive film 14B formed on the light transparent conductive substrate 11B to cover the lead-out electrode 13B.

In this case, the light transparent insulating substrates 12A and 12B may be formed of glass. The light transparent conductive films 14A and 14B may each be a combination of indium oxide and tin oxide, and the lead-out electrodes 13A and 13B may be formed of aluminum.

The lead-out electrode 13A and the light transparent conductive film 14A constitute a first electrode 22A, described later. Similarly, the lead-out electrode 13B and the light transparent conductive film 14A constitute a second electrode 22B, also described later.

In the case where the semiconductor photoelectric conversion structures 7A and 7B are formed by the aforementioned method, the semiconductor layers 8A, 8B, 9A, 9B, 10A and 10B are each formed of a non-single crystal semiconductor, in particular, an amorphous semiconductor, a semi-amorphous semiconductor containinag microcrystals on the order of 5 to 100 Å, or a microcrystalline or polycrystalline semiconductor.

The non-single crystal semiconductor forming the semiconductor layers 8A, 8B, 9A, 9B, 10A and 10B may be non-single crystal silicon (Si), germanium silicide, silicon nitride ($Si_3N_{4-x}$ ($0<x<4$)), or silicon carbide ($Si_xC_{1-x}$ ($0<x<1$)). In particular, since the semiconductor layers 8A and 8B are on the side on which light is incident, the non-single crystal semiconductor forming the layers 8A and 8B may preferably be silicon nitride ($Si_3N_{4-x}$) of silicon carbide ($Si_xC_{1-x}$) having a relatively wide band gap energy Eg of 1.8 to 2.5 eV as will be appreciated from the following description. It is also preferable, however, to employ for forming the semiconductor layers 8A and 8B amorphous or semi-amorphous silicon having a band gap energy Eg of 1.6 to 1.9 eV for the reason that in the case of the incident light being sunlight, its light absorption coefficient in the short wavelength region from 3500 to 5000 Å is 10 to 30 times larger than that of the single crystal silicon. The semiconductor layers 8A and 8B can be formed as thin as 50 to 500 Å.

For the above said reason, it is preferable that the non-single crystal semiconductor forming the semiconductor layers 9A and 9B be of amorphous or semi-amorphous silicon. The semiconductor layers 9A and 9B can be formed to a thickness of 0.5 to 1 μm, in particular, 0.5 μm.

The non-single crystal semiconductor forming the semiconductor layers 10A and 10B may preferably be amorphous or semi-amorphous $Si_3N_{4-x}$ ($0<x<4$) or $Si_xC_{1-x}$ ($0<x<1$), in particular, amorphous or semi-amorphous $Si_3N_{4-x}$ ($x=3.5$ to $3.95$) or $Si_xC_{1-x}$ ($x=0.2$ to $0.7$) having a band gap energy Eg in the range of 1.8 to 2.8 eV because it is desirable that the semiconductor layers 10A and 10B be highly resistant (i.e., inert) to redox reaction between them and the aqueous solutions 4A and 4B contained in the cells 2A and 2B described later. The semiconductor layers 10A and 10B can be made as thin as 50 to 500 Å.

The semiconductor layer 10A is of N conductivity type, and hence contains an N type impurity. As the N type impurity, there can be used any Group VA element but is preferable to employ antimony (Sb), arsenic (As), or phosphorus (P) on the ground that the semiconductor layer 10A can obtain a relatively high electric conductivity of $10^{-5}$ to $10^{-6}$ $(\Omega.cm)^{-1}$ with a relatively small amount of such N type impurity. In the case where the semiconductor layer 10A contains the N type impurity Sb, As, or P, its content can be selected to be 0.01 to 3 mol % with respect to the semiconductor forming the layer 10A.

The semiconductor layer 10B is of P conductivity type, and hence contains a P type impurity. As the P type impurity, there can be used any Group IIIA element but it is preferable to employ indium (In), gallium (Ga), or aluminum (Al) because the semiconductor layer 10B can obtain a relatively high electric conductivity with a relatively small amount of such P type impurity and because even if the above said elements are oxidized, they still remain conductive. In the case where the semiconductor layer 10B contains the P type impurity In, Ga, or Al, its content can be selected in the range of 0.01 to 3 mol % relative to the semiconductor forming the layer 10B.

The semiconductor photoelectric conversion structure 7A is disposed so that, of its semiconductor layers 8A, 9A and 10A, only the semiconductor layer 10A makes contact with the aqueous solution 4A contained in the cell 2A, as described below.

The outer marginal edge of the semiconductor photoelectric conversion structure 7A is covered with a liquid-tight insulating protective film 15A. On the other hand, a window 17A is formed in an outer side wall 16A of the redox reaction chamber 1 on the side of the cell 2A.

The semiconductor photoelectric conversion structure 7A is disposed in the window 17A to close it, with the surface of the semiconductor layer 10A on the side opposite that facing the layer 9A held in contact with the aqueous solution 4A contained in the cell 2A, the semiconductor structure 7A being fixedly attached to the window 17A through an adhesive binder 18A applied between the insulating protective film 15A and the inside of the window 17A. The semiconductor photoelectric conversion structure 7A forms a part of the outer side wall 16A of the cell 2A of the redox reaction chamber 1.

The semiconductor photoelectric conversion structure 7B is disposed so that, of its semiconductor layers 8B, 9B and 10B, only the semiconductor layer 10B makes contact with the aqueous solution 4B contained in the cell 2B as described below.

The outer marginal edge of the semiconductor photoelectric conversion structure 7B is covered with a liquid-tight insulating protective film 15 V. On the other hand, a window 17B is formed in an outer side wall 16B of the redox reaction chamber 1 on the side of the cell 2B.

The semiconductor photoelectric conversion structure 7B is disposed in the window 17B to close it, with the surface of the semiconductor layer 10B on the side opposite that facing the layer 9B held in contact with the aqueous solution 4B contained in the cell 2B, the semiconductor structure 7B being fixedly attached to the window 17B through an adhesive binder 18B applied between the insulating protective film 15B and the inside of the window 17B. The semiconductor photoelectric conversion structure 7B forms a part of the outer side wall 16B of the cell 2B of the redox reaction chamber 1.

Furthermore, the first embodiment of the light energy conversion system of the present invention is provided with a pair of first and second electrodes 22A and 22B which are connected with the semiconductor layers 8A and 8B of the semiconductor photoelectric conversion structure 7A and 7B, respectively. The first electrode 22A is formed, for instance, by the lead-out electrode 13A and the light transparent conductive film 14A described previously. Also, the second electrode 22B is similarly formed by the lead-out electrode 13B and the light transparent conductive film 14B.

The first embodiment of the light energy conversion system of the present invention is further provided with means 23 for electrically interconnecting the electrodes 22A and 22B.

The electric connecting means 23 has, for example, switch 25 inserted in a lead wire 24 connected to the lead-out electrodes 13A and 13B forming the electrodes 22A and 22B, respectively.

The above is a description of the first embodiment of the light energy conversion system of the present invention.

With such an arrangement of the light energy conversion system of the present invention as described above, when light 26 is incident on the semiconductor photoelectric conversion structures 7A and 7B through the light transparent conductive substrates 11A and 11B, there is generated between the semiconductor layer 10A of the semiconductor photoelectric conversion structure 7A and the electrode 22A a negative electric potential on the side of the semiconductor layer 10A. Likewise, there is generated between the semiconductor layer 10B of the semiconductor photoelectric conversion structure 7B and the electrode 22B a positive electric potential on the side of the semiconductor layer 10B.

The semiconductor layers 10A and 10B of the semiconductor photoelectric conversion structures 7A and 7B make contact with the aqueous solutions 4A and 4B contained in the cells 2A and 2B of the redox reaction chamber 1, respectively.

Accordingly, by closing the switch 25 to electrically interconnect the electrodes 22A and 22B, a cathodic reduction reaction occurs on the side of the cell 2A of the redox reaction chamber 1 and, on the side of the cell 2B, an anodic oxidation reaction occurs.

That is to say, in the aqueous solutions 4A and 4B contained in the cells 2A and 2B there are present hydrogen ions ($H^+$) and hydroxyl ions ($OH^-$). Therefore, a cathodic reduction reaction occurs on the side of the aqueous solution 4A to generate hydrogen gas (H₂), which can be recovered through the gas outlet means 6A. On the side of the aqueous solution 4B an anodic oxidation reaction occurs to generate oxygen gas (O₂), which can be recovered through the gas outlet means 6B. In this case, the ions H+ and OH are consumed on the sides of the aqueous solutions 4A and 4B, respectively, but unconsumed OH⁻ and H+ ions respectively flow towards the aqueous solutions 4B and 4A through the bridge 3, resulting in continuous generation of the gases H₂ an O₂ on the sides of the aqueous solutions 4A and 4B, respectively.

As described above, the first embodiment of the present invention exhibits a light energy converting function in which light energy is converted into electric energy which then elecrtolyzes an aqueous solution to thereby generate oxygen and hydrogen gases.

According to the first embodiment of the present invention, the semiconductor photoelectric conversion structures 7A and 7B and the redox reaction chamber 1 are assembled together into a unitary structure, with the semiconductor layers 10A and 10B held in contact with the aqueous solutions 4A and 4B contained in the cells 2A and 2B of the redox reaction chamber 1. Accordingly, the light energy conversion system of this embodiment can be made compact as compared with the conventional light energy conversion systems.

Furthermore, according to the first embodiment of the present invention, since the semiconductor layers 10A and 10B of the semiconductor photoelectric conversion structures 7A and 7B are in contact with the aqueous solutions 4A and 4B in the cells 2A and 2B of the redox reaction chamber 1, there is no need of providing an electrode which makes contact with the aqueous solution in the redox reaction chamber 1. Moreover, the only electric connecting means associated with the semiconductor photoelectric conversion structure is the means 23 for electrically interconnecting the electrodes 22A and 22B.

Therefore, the first embodiment of the present invention is advantageous over the prior art systems in that the number of parts used is small and that the formation of electrical connections of the semiconductor photoelectric conversion structure is less troublesome and time-consuming.

Figure 2:
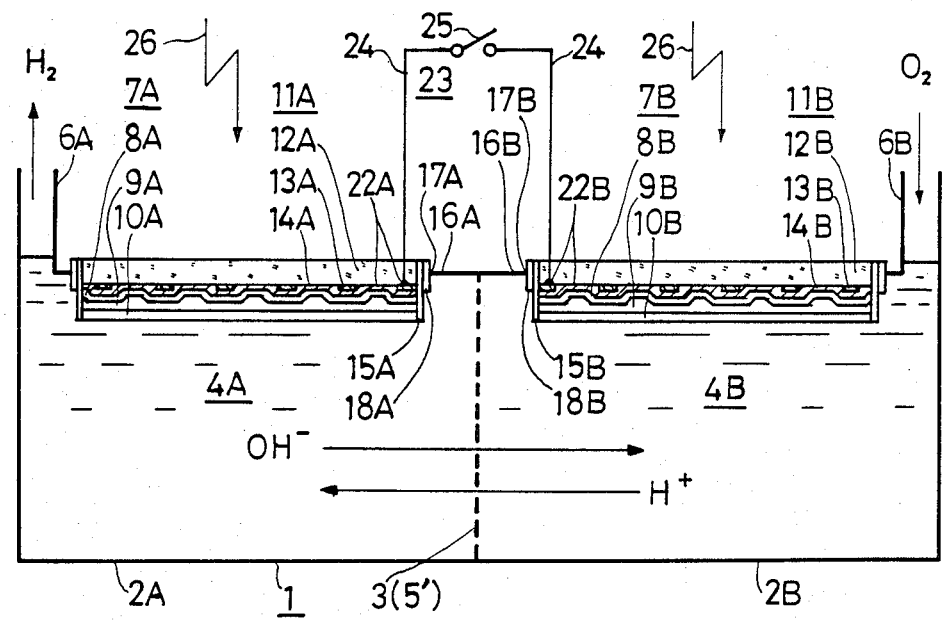
FIG. 2 is a sectional view schematically illustrating a second embodiment of the light energy conversion system of the present invention.

Next, a description will be given, with reference to FIG. 2, of the second embodiment of the light energy conversion system of the present invention. In FIG. 2, the parts corresponding to those in FIG. 1 are identified by the same reference numerals.

The second embodiment of the present invention is identical in construction with the first embodiment of FIG. 1 except that the aqueous solution bridge 5 forming the bridge 3 of the redox reaction chamber 1 is replaced with an ion exchange membrane forming an ion bridge 5'.

Even if the bridge 3 of the redox reaction chamber 1 is the ion bridge 5', OH⁻ and H+ ions generated in the aqueous solutions 4A and 4B contained in the cells 2A and 2B of the redox reaction chamber 1 can be directed to the aqueous solutions 4B and 4A.

Accordingly, though not described in detail, the second embodiment of the present invention shown in FIG. 2 also possesses excellent features as is the case with the first embodiment of FIG. 1.

Next, a description will be given, with reference to FIGS. 3 and 4, of third and fourth embodiments of the present invention, in which the parts corresponding to those in FIGS. 1 and 2 are identified by the same reference numerals.

The third and fourth embodiments of the present invention are identical in construction with the first and second embodiments of FIGS. 1 and 2 except that aqueous solution inlet means 30 is provided for introducing the aqueous solution 4 into the cells 2A and 2B of the redox reaction chamber 1.

Figure 3:
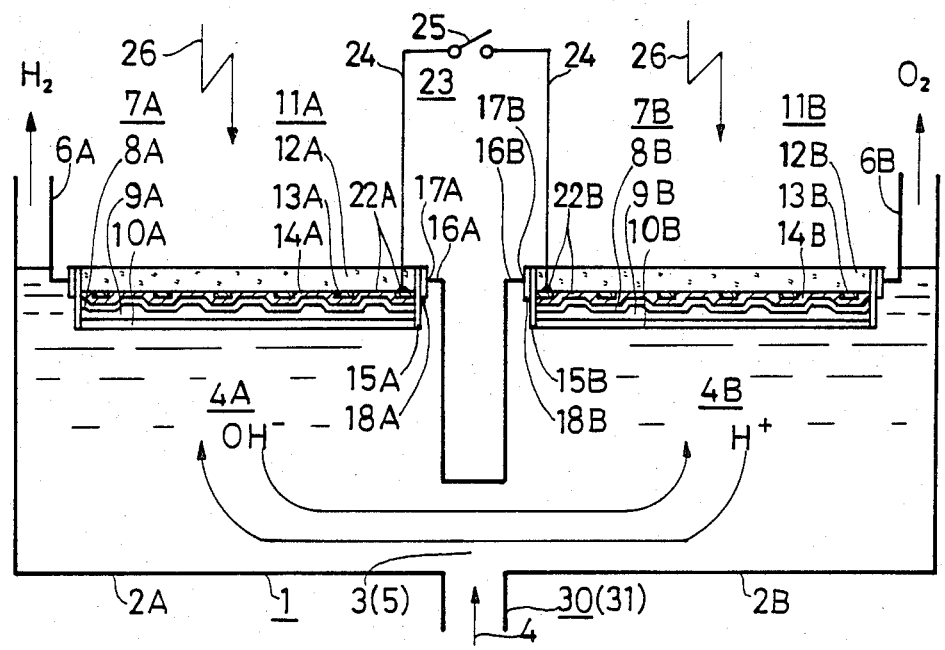
FIG. 3 is a sectional view schematically illustrating a third embodiment of the light energy conversion system of the present invention.

In the third embodiment shown in FIG. 3, the aqueous solution inlet means 30 is formed by a pipe 31 which is formed integrally with the redox reaction chamber 1 to extend outwardly thereof, for example, from the bottom of the bridge 3 and permits the passage therethrough of the aqueous solution 4 into the cells 2A and 2B.

Figure 4:
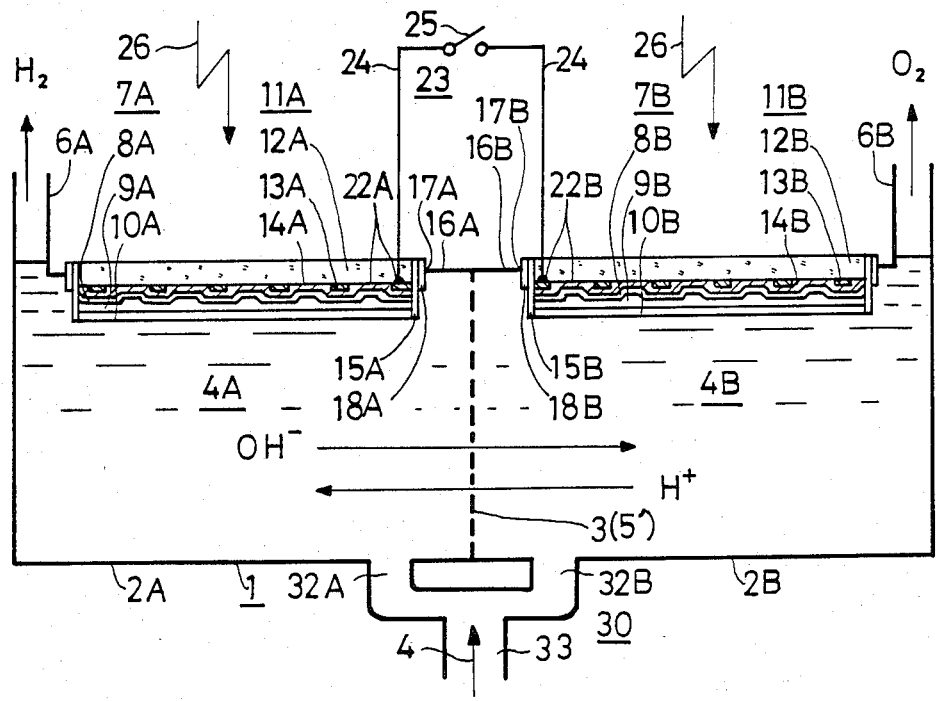
FIG. 4 is a sectional view schematically illustrating a fourth embodiment of the light energy conversion system of the present invention.

In the fourth embodiment shown in FIG. 4, the aqueous solution inlet means 30 is formed by branch pipes 32A and 32B extending outwardly of the bottoms of the cells 2A and 2B of the redox reaction chamber 1 and pipe 33 formed integrally with the branch pipes 32A and 32B and extending from their ends in common with them.

The above is a description of the third and fourth embodiments of the present invention.

Accordingly, though not described in detail, the third and fourth embodiments of FIGS. 3 and 4 also possess the same excellent features as do the first and second embodiments shown in FIGS. 1 and 2.

Furthermore, in the third and fourth embodiments shown in FIGS. 3 and 4, the aqueous solutions 4A and 4B in the cells 2A and 2B of the redox reaction chamber 1 are consumed by releasing the hydrogen and oxygen gases to the outside through the gas outlet means 6A and 6B, but the consumption of the aqueous solutions 4A and 4B is made up for by the supply of the aqueous solution 4 into the redox reaction chamber 1 through the aqueous solution inlet means 30.

Accordingly, the third and fourth embodiment of FIGS. 3 and 4 possess the advantage that the oxygen and hydrogen gases can be generated continuously over a long period of time.

Next, a description will be given, with reference to FIGS. 5 and 6, of fifth and sixth embodiments of the light energy conversion system of the present invention; in which the parts corresponding to those in FIGS. 3 and 4 are identified by the same reference numerals.

Figure 5:
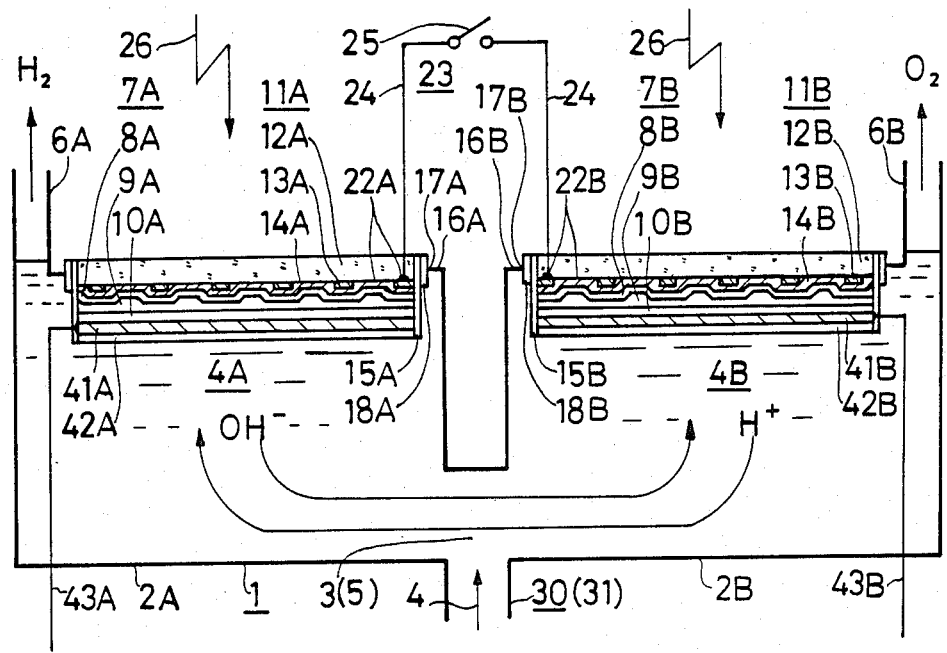
FIG. 5 is a sectional view schematically illustrating a fifth embodiment of the light energy conversion system of the present invention.
Figure 6:
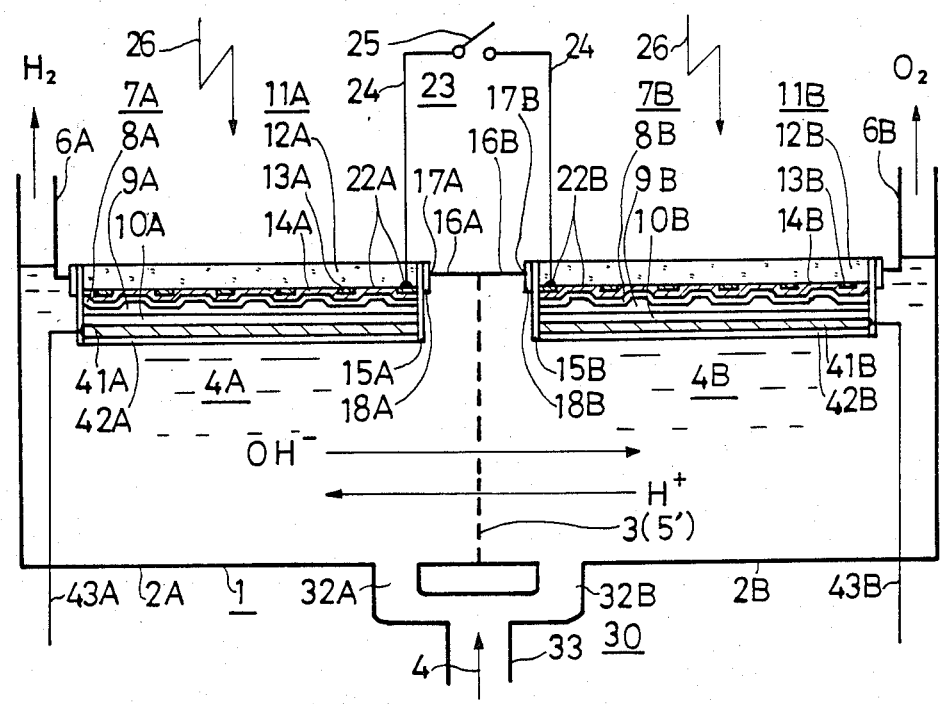
FIG. 6 is a sectional view schematically illustrating a sixth embodiment of the light energy conversion system of the present invention.

The fifth and sixth embodiments illustrated in FIGS. 5 and 6 are identical in construction with the third and fourth embodiments of FIGS. 3 and 4 except that the semiconductor layers 10A and 10B of the semiconductor photoelectric conversion structures 7A and 7B are respectively covered with metallic conductive layers 41A and 41B, which are, in turn, covered with semiconductor layers 42A and 42B of the same P and N conductivity types as that of the semiconductor layers 10A and 10B, respectively.

Accordingly, the fifth and sixth embodiments of FIGS. 5 and 6, only the semiconductor layers 42A and 42B are held in contact with the aqueous solutions 4A and 4B contained in the cells 2A and 2B of the redox reaction chamber 1, instead of the semiconductor layers 10A and 10B of the semiconductor photoelectric conversion structures 7A and 7B in the third and fourth embodiments shown in FIGS. 3 and 4.

In this case, the metallic conductive layers 41A and 41B of the semiconductor photoelectric conversion structures 7A and 7B can be formed by a known CVD, reduced pressure CVD, or plasma CVD method or, in some cases, by a vacuum evaporation method.

Moreover, the semiconductor layers 42A and 42B of the semiconductor photoelectric conversion structures 7A and 7B are formed by the known CVD, reduced pressure CVD, or plasma CVD method, as is the case with the other semiconductor layers 8A, 8B, 9A, 9B, 10A and 10B.

In the case where the semiconductor layers 42A and 42B are formed by the above said method, they are formed of non-single crystal semiconductor; in particular, an amorphous or semi-amorphous semiconductor. The semiconductor layers 42A and 42B make contact with the aqueous solutions 4A and 4B in the cells 2A and 2B of the redox reaction chamber 1 and perform the redox reaction with the aqueous solutions 4A and 4B as described previously with respect to FIG. 1; therefore, it is desirable that the semiconductor layers 42A and 42B be highly resistant (i.e., inert) to the redox reaction. For this reason, it is preferable that the semiconductor layers 42A and 42B be formed of amorphous or semi-amorphous $Si_3N_{4-x}$ $(0<x<4)$ or $Si_xC_{1-x}$ $(0<x<1)$, in particular, amorphous or semi-amorphous $Si_3N_{4-x}$ $(x=3.5$ to $3.95)$ or $Si_xC_{1-x}$ $(x=0.2$ to $0.7)$ which has a band gap energy Eg in the range of 1.8 to 2.8 eV. The semiconductor layers 42A and 42B can be made as thin as 50 to 500 Å.

Besides, the semiconductor layers 10A and 10B do not make contact with the aqueous solutions 4A and 4B in the cells 2A and 2B of the redox reaction chamber 1, and hence they need not always be formed of the amorphous or semi-amorphous $Si_3N_{4-x}$ $(0<x<4)$ or $Si_xC_{1-x}$ $(0<x<1)$ as referred to previously with respect to FIG. 1 but rather may be made of amorphous or semi-amorphous silicon.

The structure made up of the semiconductor layer 10A, the metallic conductive layer 41A and the semiconductor layer 42A forming the semiconductor photoelectric conversion structure 7A is equivalent, in terms of function, to the semiconductor layer 10A in the third and fourth embodiments described previously in connection with FIGS. 3 and 4.

Similarly, the structure made up of the semiconductor layer 10B, the metallic conductive layer 41B and the semiconductor layer 42B forming the semiconductor photoelectric structure 7B is equivalent, in terms of function, to the semiconductor layer 10B in the third and fourth embodiments described previously in connection with FIGS. 3 and 4.

Accordingly, though not described in detail, the fifth and sixth embodiments of FIGS. 5 and 6 also have the same excellent features as those obtainable with the third and fourth embodiments of FIGS. 3 and 4.

With the first and sixth embodiments of the present invention, electric power generated by incidence of light 26 on the semiconductor layers 10A and 10B of the semiconductor photoelectric conversion structures 7A and 7B and the electrode 22A and 22B can be obtained across the metallic conductive layers 41A and 41B, respectively.

Consequently, by means of output leads 43A and 43B from the metallic conductive layers 41A and 41B, respectively, it is possible to withdraw the hydrogen and oxygen gases from the redox reaction chamber 1 while at the same time utilizing the electric power generated in the semiconductor photoelectric conversion structures 7A and 7B.

Incidentally, the foregoing embodiments should be construed as being merely illustrative of the present invention and it will be apparent that many modifications and variations may be effected without departing from the spirits of the present invention.

For example, in each of the above-described embodiments of the present invention, the semiconductor photoelectric conversion structure 7A and 7B may each be modified so that one PIN junction formed by the three semiconductor layers (8A to 10A, 8B to 10B) is replaced with two or more such PIN junctions. In this case, since electric current of higher voltage than in the afore described embodiments can be produced in the semiconductor photoelectric conversion structure 7A and 7B, hydrogen and oxygen gases can be generated with higher efficiency than in the first to sixth embodiments described in the foregoing.

Moreover, in the foregoing embodiments of the present invention, it is also possible that the junctions between adjacent semiconductor layers (8A and 9A, 9A and 10A, 8B and 9B, 9B and 10B) forming the semiconductor photoelectric conversion structures 7A and 7B are made gradual, as disclosed in U.S. Pat. No. 4,239,554, and that the semiconductor layers (8A, 8B) or (8A and 9A, 8B and 9B) on which the light 26 is incident, are formed as so-called graded band gap type ones which have a wider band gap energy Eg than does the semiconductor layer (10A, 10B) on the opposite side from the side on which the light 26 is incident. In this case, a high photoelectric conversion efficiency can be obtained with the semiconductor photoelectric conversion structures 7A and 7B.

I claim:
1. A light energy conversion system comprising:
a redox reaction chamber provided with first and second cells in intercommunication through a bridge and respectively containing first and second aqueous solutions of the same kind, and hydrogen and oxygen gas outlet means extending outwardly of the first and second cells, respectively;
a first semiconductor photoelectric conversion structure having a P type first non-single-crystalline semiconductor layer, an I type second non-single-crystalline semiconductor layer formed on the first non-single-crystalline semiconductor layer, and a heavily doped, N type third non-single-crystalline semiconductor layer formed on the second non-single-crystalline semiconductor layer;
a second semiconductor photoelectric conversion structure having an N type fourth non-single-crystalline semiconductor layer, an I type fifth non-single-crystalline semiconductor layer formed on the fourth non-single-crystalline semiconductor layer, and a heavily doped, P type sixth non-single-crystalline semiconductor layer formed on the fifth non-single-crystalline semiconductor layer;
a first electrode connected to the first non-single-crystalline semiconductor layer of the first semiconductor photoelectric conversion structure;
a second electrode connected to the fourth non-single-crystalline semiconductor layer of the second semiconductor photoelectric conversion structure and paired with the first electrode; and
means for electrically interconnecting the first and second electrodes;
wherein the first semiconductor photoelectric conversion structure is provided in the first cell (a) so that it forms a part of the first cell wall, (b) so that light is incident on the first semiconductor photoelectric conversion structure directly without passing through the first aqueous solution in the first cell, and (c) so that only the portion of the semiconductor photoelectric conversion structure on the side of the third non-single-crystalline semiconductor layer is held in contact with the first aqueous solution; and wherein the second semiconductor photoelectric conversion structure is provided in the second cell (a) so that it forms a part of the second cell wall, (b) so that light is incident on the second semiconductor photoelectric conversion structure directly without passing through the second aqueous solution in the second cell, and (c) so that the portion of the semiconductor photoelectric conversion structure on the side of the sixth non-single-crystalline semiconductor layer is held in contact with the second aqueous solution.

2. A light energy conversion system according to claim 1 wherein the bridge in the redox reaction chamber is an aqueous solution bridge which permits the passage therethrough of the first and second aqueous solutions contained in the first and second cells.

3. A light energy conversion system according to claim 1 wherein the bridge in the redox reaction chamber is an ion bridge which permits the passage therethrough of ions generated in the aqueous solutions contained in the first and second cells.

4. A light energy conversion system according to claim 1, 2 or 3 wherein the first and second semiconductor photoelectric conversion structures are disposed side by side on the side of the same wall of the redox reaction chamber.

5. A light energy conversion system according to claim 4 wherein the third and sixth non-single-crystalline semiconductor layers of the first and second semiconductor photoelectric conversion structures are formed of $Si_3N_{4-x}(0<x<4)$ or $Si_xC_{1-x}(0<x<1)$.

6. A light energy conversion system according to claim 1, 2 or 3 wherein the third and sixth non-single-crystalline semiconductor layers of the first and second semiconductor photoelectric conversion structures are formed of Si, germanium silicide, $Si_3N_{4-x}(0<x<4)$, or $Si_xC_{1-x}(0<x<1)$.

7. A light energy conversion system according to claim 6 wherein the third non-single-crystalline semiconductor layer contains 0.01 to 3 mol% of Sb, As, or P as an N type impurity.

8. A light energy conversion system according to claim 6 wherein the sixth non-single-crystalline semiconductor layer contains 0.01 to 3 mol% of In, Ga, or Al as a P type impurity.

9. A light energy conversion system according to claim 1, 2 or 3 which further comprises aqueous solution inlet means for introducing into the first and second cells of the redox reaction chamber an aqueous solution serving as the first and second aqueous solutions therein.

10. A light energy conversion system according to claims 1, 2, or 3 which further comprises first and second leads connected to the third and sixth semiconductor layers of the first and second photoelectric conversion semiconductor structures, respectively.

* * * * *